(12) United States Patent
Ozakdag et al.

(10) Patent No.: US 11,803,357 B1
(45) Date of Patent: Oct. 31, 2023

(54) ENTITY SEARCH ENGINE POWERED BY COPY-DETECTION

(71) Applicant: Palantir Technologies Inc., Denver, CO (US)

(72) Inventors: Gokcan Ozakdag, London (GB); Mihir Pandya, San Jose, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/651,220

(22) Filed: Feb. 15, 2022

Related U.S. Application Data

(60) Provisional application No. 63/149,955, filed on Feb. 16, 2021.

(51) Int. Cl.
    *G06F 8/36* (2018.01)
    *G06F 8/70* (2018.01)

(52) U.S. Cl.
    CPC . *G06F 8/36* (2013.01); *G06F 8/70* (2013.01)

(58) Field of Classification Search
    CPC .................................... G06F 8/36; G06F 8/70
    USPC .................................................. 717/107–130
    See application file for complete search history.

(56) References Cited

U.S. PATENT DOCUMENTS

| | | | | |
|---|---|---|---|---|
| 5,263,742 A * | 11/1993 | Koch | ................... | A61B 5/1172 283/105 |
| 6,976,170 B1 * | 12/2005 | Kelly | ....................... | G09B 7/02 713/181 |
| 7,219,301 B2 * | 5/2007 | Barrie | .................... | G06Q 50/00 434/367 |
| 7,487,145 B1 * | 2/2009 | Gibbs | ................. | G06F 16/3322 707/999.005 |
| 7,493,596 B2 * | 2/2009 | Atkin | ........................ | G06F 8/71 717/124 |
| 7,665,073 B2 * | 2/2010 | Meijer | .................... | G06F 8/425 717/116 |
| 7,730,460 B1 * | 6/2010 | Warren | ................. | G06F 11/323 717/133 |

(Continued)

OTHER PUBLICATIONS

Gupta et al., "Efficient Fingerprint-based User Authentication for Embedded Systems", ACM, pp. 244-247 (Year: 2005).*

(Continued)

*Primary Examiner* — Anil Khatri
(74) *Attorney, Agent, or Firm* — Knobbe, Martens, Olson & Bear, LLP

(57) ABSTRACT

Systems and methods for identifying associations between a code snippet query and stored computer code stored. The method can receive a code query identifying a code snippet to search for, determine a fingerprint of the query code snippet, and search the stored software using the fingerprint to identify software results of code similar to the query code snippet. The fingerprint can be determined by generating k-grams of the code snippet. The k-grams used for the search can be down-selected based on a winnowing process. The method can remove from the software results code that is associated with sanctioned software. The method can include coalescing the software results to produce a subset of the software results, generating a code search user interface comprising information indicative of the subset of software results, and causing presentation of the code search user interface and displaying the subset of software results.

20 Claims, 10 Drawing Sheets

(56) References Cited

U.S. PATENT DOCUMENTS

| | | | | |
|---|---|---|---|---|
| 8,010,951 | B2* | 8/2011 | Kulp | G06F 8/38 |
| | | | | 717/111 |
| 8,464,210 | B1* | 6/2013 | Tarle | G06F 8/70 |
| | | | | 717/136 |
| 8,997,061 | B1* | 3/2015 | Davison | G06F 11/3688 |
| | | | | 717/124 |
| 9,921,827 | B1* | 3/2018 | Evans | G06F 9/44536 |
| 10,574,466 | B1* | 2/2020 | Gopalakrishnan | H04L 9/3242 |
| 11,500,619 | B1* | 11/2022 | Abdelaziz | G06F 8/33 |
| 11,675,691 | B2* | 6/2023 | Sathianarayanan | G06F 9/54 |
| | | | | 717/124 |
| 11,698,777 | B2* | 7/2023 | Mohiseen | G06F 8/20 |
| | | | | 717/107 |
| 2005/0114840 | A1* | 5/2005 | Zeidman | G06F 8/71 |
| | | | | 717/126 |
| 2021/0192203 | A1* | 6/2021 | Ren | G06F 40/126 |

OTHER PUBLICATIONS

Jain et al, "Filterbank-Based Fingerprint Matching", IEEE, pp. 846-859 (Year: 2000).*

Yan et al, "Are the Code Snippets What We Are Searching for? A Benchmark and an Empirical Study on Code Search with Natural-Language Queries", IEEE, pp. 344-354 (Year: 2020).*

Ryman et al, "Application of Source Code Plagiarism Detection and Grouping Techniques for Short Programs", IEEE, pp. 1-7 (Year: 2011).*

Saifullah et al, "Learning from Examples to Find Fully Qualified Names of API Elements in Code Snippets", IEEE, pp. 243-254 (Year: 2019).*

Sumner et al, "Coalescing Executions for Fast Uncertainty Analysis", ACM, pp. 581-590 (Year: 2011).*

Schleimer et al., "Winnowing: Local Algorithms for Document Fingerprinting", SIGMOD 2003, Jun. 9-12, 2003, San Diego, CA, pp. 10.

* cited by examiner

ENTITY SEARCH ENGINE POWERED BY COPY-DETECTION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and techniques for identifying portions of code for reuse. More specifically, the present disclosure relates to fingerprinting code snippets within an organization such that similar existing code can be searched for throughout an organization, identified and reused, increasing efficiency by, for example, eliminating, or minimizing, multiple instances of writing the same, or nearly the same, code.

BACKGROUND

Organizations often have a vast collection of programs and applications that were generated for one purpose or project, but may be useful for other purposes and projects. For example, it is likely that logic is being generated to derive similar insights for different clients. However, identifying desired portions of code can be difficult in large data stores. Accordingly, it would beneficial for systems that encourage discoverability and reusability of insights and code because it can benefit the data platform users and maintainers, increase efficiency and reduce code generation costs.

SUMMARY

The invention is defined by the independent claims. The dependent claims concern optional features of some embodiments of the invention. The systems, methods, and devices described herein each have several aspects, no single one of which is solely responsible for its desirable attributes. Without limiting the scope of this disclosure, several non-limiting features will now be discussed briefly.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

One aspect of the disclosure provides a system for identifying a portion of preexisting code to search for, generating a fingerprint corresponding to the code sought, searching pre-existing code using the fingerprint, and presenting the search results on a user interface. In one embodiment, the system includes one or more computer readable storage devices configured to store a plurality of stored software in a searchable format, information indicative of sanctioned software, and a plurality of computer readable instructions. The system can also include one or more processors configured to execute the plurality of computer readable instructions to cause the computer system to perform operations, comprising determining a query code snippet to search for, determining by a winnowing process a fingerprint of the query code snippet searching the stored software, using the fingerprint, to identify software results similar to the query code snippet and that are not found in sanctioned software, and coalescing the software results to produce a subset of the software results. The system can also include generating a code search user interface comprising information indicative of the subset of software results, and causing presentation of the code search user interface.

One innovation includes a code identification computer system, comprising one or more computer readable storage devices configured to store: a set of software programs, a database configured to store fingerprints of each of the set of software programs in a searchable format, and to store information associating each fingerprint with its respective software program, sanctioned information indicative of sanctioned software, the sanctioned software being a subset of the set of software programs, and a plurality of computer readable instructions. The code identification computer system also includes one or more processors configured to execute the plurality of computer readable instructions to cause the computer system to perform operations comprising: receiving a query code snippet identifying code to be matched, determining fingerprints of the query code snippet, the fingerprints based on a plurality of k-grams of the query code snippet, searching the database using the fingerprints of the query code snippet to determine a software match list, the software match list indicating software programs having a fingerprint that matches a fingerprint of the query code snippet, removing, from the software match list, software that is identified by the sanctioned information as sanctioned software, and ranking the software on the software match list to determine a ranked software match list, the ranking indicative of how well the fingerprints of the software on the software match list matches fingerprints of the query code snippet.

Such systems may include other one or more other aspects/features described herein in various embodiments. For example, in some embodiments, the one or more processors are further configured to execute the plurality of computer readable instructions to cause the computer system to perform operations comprising generating a code search user interface, and causing presentation of the ranked software match list on the code search user interface. In some embodiments, the sanctioned software comprises library code. In some embodiments, the sanctioned software comprises code that has been designated to not include in the software match list. In some embodiments, the sanctioned software comprises boilerplate code. In some embodiments, the sanctioned software comprises code that has been designated to not include in the software match list, library code, and/or boilerplate code.

In some embodiments, determining fingerprints of the query code snippets comprises computing a set of k-grams of the code snippet, hashing the k-grams to generate a sequence of n hashes $h_1, h_2, \ldots, h_n$, grouping the hashes into a set of sequential windows w having x number of sequential hashes from the sequence of hashes such that the set of sequential windows includes n−x+1 windows, the first window $w_1$ including hashes $h_1\ h_2 \ldots h_x$ of the sequence of hashes, and each subsequent window $w_{i=2} \ldots w_{i=n-x+1}$ including hashes $h_i$ to $h_{i+x-1}$ of the sequence of hashes, and winnowing the hashes in the windows to determine a fingerprint of the query code snipper, wherein the fingerprint comprises a subset of the hashes in the set of sequential windows w. In some embodiments, said winnowing comprises selecting a minimum hash value in each window of the set of sequential windows. In some embodiments, for any window of hashes having more than one minimum value, the selected minimum hash value in the respective window is the right-most minimum hash value in the window. In some embodiments, k is greater or equal to 5, and k is less than or equal to 20. In some embodiments, k is greater or equal to 20, and k less than or equal to 50. In some embodiments, k is greater or equal to 50.

In some embodiments of a code identification computer system, ranking the software match list comprises ranking the software programs, on the software match list having a higher number of adjacent k-grams matches, higher than software programs on the software match list that do not have adjacent k-grams matches. In some embodiments, the one or more processors are further configured to execute the plurality of computer readable instructions to cause the computer system to perform operations comprising normalizing the code snippet. In some embodiments normalizing the code snippet is performed prior to the determining the fingerprint of the code snippet. In some embodiments, the one or more processors are further configured to execute the plurality of computer readable instructions to cause the computer system to provide the software match list in a file. In some embodiments of the code identification computer system, the one or more processors are further configured to generate and store fingerprints of the set of programs, and store the fingerprints of the set of programs in the database.

Another innovation includes a computer-implemented method for identifying code, the method comprising receiving a query code snippet identifying code to be matched, determining fingerprints of the query code snippet, the fingerprints based on a plurality of k-grams of the query code snippet, searching a database using the fingerprints of the query code snippet to determine a software match list, the software match list indicating software programs having a fingerprint that matches a fingerprint of the query code snippet, wherein the database is configured to store fingerprints of each of the software programs in a searchable format, and to store information associating each fingerprint stored in the database with its respective software program, removing, from the software match list, software that is identified by the sanctioned information as sanctioned software, the sanctioned software being a subset of the software programs, and ranking the software on the software match list to determine a ranked software match list, the ranking indicative of how well the fingerprints of the software programs on the software match list match fingerprints of the query code snippet.

Such methods may include other one or more other aspects/features described herein in various embodiments. For example, in some embodiments, the method further comprises generating a code search user interface, and causing presentation of the ranked software match list on the code search user interface. In some embodiments of such methods, determining fingerprints of the query code snippets comprises computing a set of k-grams of the code snippet, hashing the k-grams to generate a sequence of n hashes $h_1$, $h_2$, . . . , $h_n$, grouping the hashes into a set of sequential windows w having x number of sequential hashes from the sequence of hashes such that the set of sequential windows includes n−x+1 windows, the first window $w_1$ including hashes $h_1$ $h_2$ . . . $h_x$ of the sequence of hashes, and each subsequent window $w_{i=2}$ . . . $w_{i=n-x+1}$ including hashes $h_i$ to $h_{i+x-1}$ of the sequence of hashes, and winnowing the hashes in the windows to determine a fingerprint of the query code snippet, wherein the fingerprint comprises a subset of the hashes in the set of sequential windows w, wherein winnowing comprises selecting a minimum hash value in each window of the set of sequential windows. In some embodiments, ranking the software match list comprises ranking the software programs, on the software match list having a higher number of adjacent k-grams matches, higher than software programs on the software match list that do not have adjacent k-grams matches, and wherein the method further comprises normalizing the query code snippet prior to the determining the fingerprint of the query code snippet.

BRIEF DESCRIPTION OF THE DRAWINGS

FIG. 9 is an example of a screenshot illustrating an example of fingerprinting a query snippet, and then searching for the fingerprinted query snippet, according to some embodiments.

DETAILED DESCRIPTION

Overview

Figure 1:
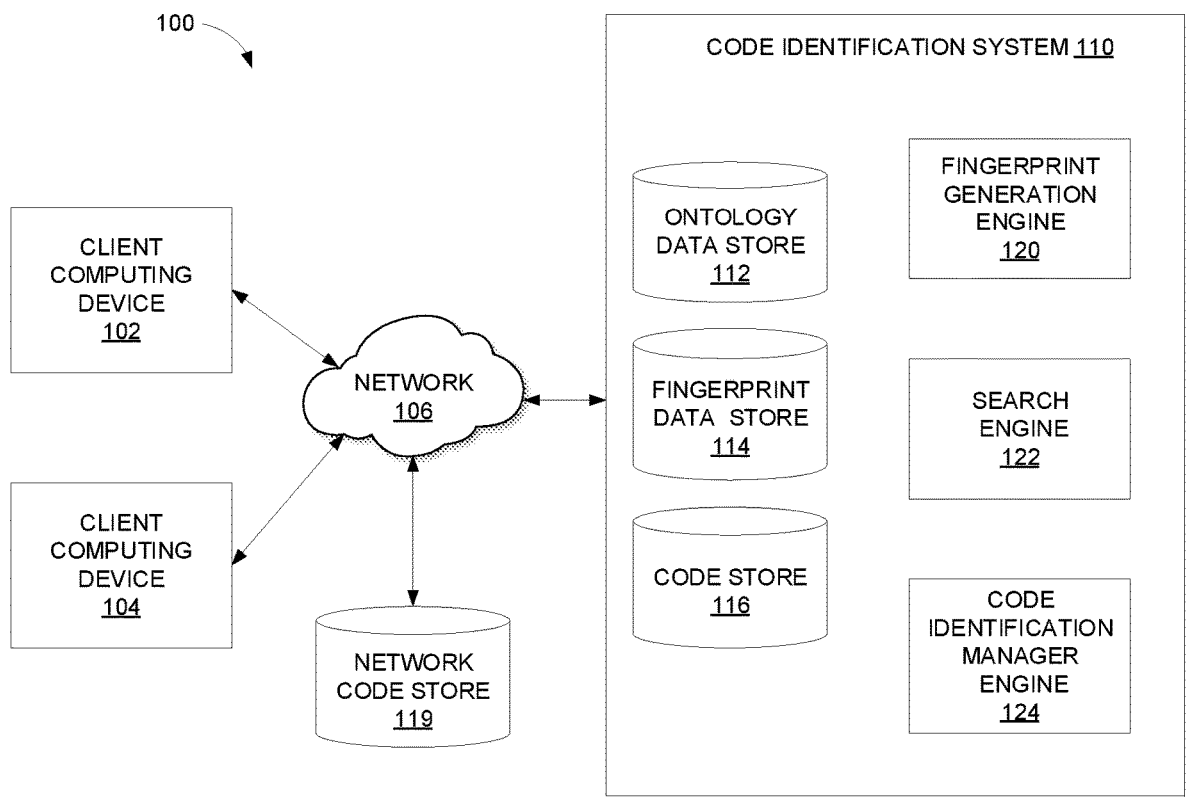
FIG. 1 is an overview of an example code search system.

For purposes of improving code reuse across an organization it is advantageous to be able to identify previously written code that has certain desired features and that was generated for other projects. Organizations often have a vast collection of programs and applications that were generated for one purpose or project, and may be useful for other purposes and projects. Efficient and accurate processes for identifying desired portions of code can be difficult especially across different programming languages. Systems that encourage discoverability and reusability of insights and code because it can benefit the data platform users and maintainers, increase efficiency and reduce code generation costs.

A computer system or software framework is provided for fingerprinting code snippets within an organization such that similar existing code can be identified and reused. In one embodiment, fingerprints of code snippets are computed by first normalizing code snippets, and then computing the fingerprints of the normalized code snippets The normalizing process can include replacing all variable names to deterministic variable names and removing whitespaces or indents as appropriate. The normalizing plugins can even choose to go as deep as expanding eligible lambdas to deterministic for-loops.

In one embodiment, a user-defined ontology may define certain properties of the fingerprinted code snippets specific to the one or more types of data objects. These defined properties are referred to as object definitions. The function access system accesses an object definition for one or more types of data objects and identifies objects with similar properties/fingerprints.

A code snippet that the user wants to query for to find existing similar code may be referred to herein as a query code snippet. The process for computing fingerprints of a query code snippet can include computing k-grams of each code snippet, hashing the k-grams, and picking k-grams in a sliding window of size w—these k-grams are the fingerprints of the code snippets. In some embodiments, a "blacklisting" process can be used to limit the code search. In the code search context, blacklisting allows sanctioned copies of software to be ignore when evaluating search results. Examples of sanctioned copies can include, for example, library import code, boilerplate code (e.g., transforms annotations), and copies otherwise designated as sanctioned for other reasons. The same fingerprinting techniques can be applied to these sanctioned copies, but when evaluating search results, k-grams corresponding to these sanctioned copies are ignored.

A coalescing process can be a final step in evaluating search queries. In one embodiment, when fingerprinting a query code snippet, it is broken it down into segments represented by k-grams, which are hashed. Fingerprints of the query code snippet are represented by some the hashes, which may be determined by a winnowing process. The fingerprints are then used to search fingerprints of existing code to determine matches between the fingerprints of the query code snippet and fingerprints of the existing code. Some matches of the fingerprints of a query code snippet to the fingerprints of software programs will be better than others. For example, the higher number of contiguous matches of fingerprints indicates a higher likelihood of a desired match (e.g., the code identified is what is being searched for). Likewise, a lower number of contiguous matches indicates a lower likelihood of a desired match. A coalescing process can determine which fingerprints have a more contiguous k-gram matches rather than spurious k-gram matches. For example, in a case where k-grams k1 and k2 have a match in both code snippets C1 and C2, if k1 and k2 are adjacent in C1 but not adjacent in C2, the code snippet C1 can be ranked higher than code snippet C2. In an example, a coalescing process determines how close together, or contiguous, (multiple) fingerprint matches are within an identified software program (or document), and then identified documents can be rated based on the such a determination. In some embodiments, a coalescing process can determine the size of an interval between two matches in an identified software program as a measure of how contiguous the fingerprint matches are.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Entity: An individual, a group of individuals (e.g., a household of individuals, a married couple, etc.), a business, or other organization.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties (or "Attributes"): information about a data object, such as an entity, that represent the particular data object. Each attribute of a data object has a property type and a value or values. Entity properties, for example, may include name, address, postal code, IP address, username, phone number, etc.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Ontology: Stored information that provides a data model for storage of data in one or more databases. For example, the stored data may comprise definitions for data object types and respective associated property types. An ontology may also include respective link types/definitions associated with data object types, which may include indications of how data object types may be related to one another. An ontology may also include respective actions associated with data object types. The actions associated with data object types may include, e.g., defined changes to values of properties based on various inputs. An ontology may also include respective functions, or indications of associated functions, associated with data object types, which functions, e.g., may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types. The technical aspects of an ontology are referred to as object definitions specifying, e.g. data formats, storage format, and storage locations of associated types of data objects.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Blacklisting: A process for limiting a search process that allows certain copies of software code ("code") to be ignored when evaluating the search results. For example, sanctioned copies of code, boilerplate code, and/or library support code.

Sanctioned Copy: a designation associated with certain code that indicates the code should not be included in search results.

K-grams: are k-length subsequences of a string. Here, k can be 1, 2, 3, and so on. As an example, consider the string "catastrophic." Where k=1, k-grams are "c", "a", "t", "a", "t", "r", "o", "p", "h", "i", and "c." Where k=2, k-grams are "ca", "at", "ta", "as", "st", "tr", "ro", "op", "ph", "hi", and "ic." And where k=3, k-grams are "cat", "ata", "tas", "ast", "str", "tro", "rop", "oph", "phi", and "hic." While k-grams are widely used for spelling correction, k-grams can also be used to identify similarities between strings. The value of "k" depends on the situation and context of use.

Coalescing: a process for ranking code identified in a search based on a characteristic, for example, based on having larger portions of similarities. In one embodiment, the characteristic is determined by the position of multiple fingerprints in identified code. For example, a measure of the space between two or more fingerprints in the identified code.

Winnowing: a technique for selecting fingerprints from hashes of k-grams. Performance of a winnowing process can be trade-off between the number of fingerprints that must be selected and the shortest match that is guaranteed to detect. In a winnowing embodiment, given a set of documents, it is desired to find substring matches between them that satisfy two properties; (i) if there is a substring match at least as long as the guarantee threshold, t, then this match is detected, and (ii) we do not detect any matches shorter than the noise threshold, k. The constants t and k≤t are chosen by the user. We avoid matching strings below the noise threshold by considering only hashes of k-grams. The larger k is, the more confident we can be that matches between documents are not coincidental. Larger values of k also limit the sensitivity to reordering of document contents, as we cannot detect the relocation of any substring of length less than k. Thus, it can be important to choose k to be the minimum value that eliminates coincidental matches.

Examples of Function Access Systems and Methods

FIG. 1 is an overview of an example code search system. The example computing/network environment 100 may comprise one or more client computing devices, e.g., a first client computing device 102 and a second client computing device 104, and a code identification system 110. In some embodiments, the first client computing device 102, second client computing device 104, and code identification system 110 may be in communication with one another over network 106. In some embodiments, network 106 may comprise the Internet, a local area network, a wide area network, a wireless network, and/or any combination of the foregoing. Code may be stored in a component of the code identification system 110, for example, in a computer storage component code store 118. Code also may be stored in a computer storage component in communication with the network 106, and the code identification system 110 via the network 106, for example, network code store 119.

Each of client computing devices 102, 104 may be a computer, handheld mobile computing device, or other computing system. A user of a client computing device 102, 104 may write code and submit code for storage (e.g., in association with a first project). A user of a client computing device 102, 104 may submit a "code query" to search for, and identify, certain code that is desired for use (e.g., on a second project, other than the project for which the code was initially written). A number of computing systems 102, 104 may be used by a number of different users to submit code for storage or to submit code queries to the code identification system 110. The code submitted may be associated with a type of data object. The association of the code with the type of data object maybe done by the user, or automatically by the code identification system. It will be appreciated that, in some embodiments, multiple users may utilize one or more client computing devices 102, 104 to store code and to submit code queries.

Code identification system 110 may be configured to generate fingerprints of existing code and store the fingerprints of the existing code in a fingerprint data store 114. In various embodiments, the fingerprint data store 114 can be a database. For example, an ontological-structured database that includes objects representing software program, each object being associated with, or having, fingerprints of the software programs and information identifying the software program. In some embodiments, the court identification system 110 also includes ontology data store 112 that includes information used to generate the ontological data store 114. In some embodiments, software programs can be stored on the code identification system 110 in a code store 116 computer storage component. In some embodiments, software programs can be stored in a network code store 119 computer storage component that is in communication with the code identification system 110 via network 106.

The code identification system can further include a fingerprint generation engine 120, a search engine 122, and a code identification manager engine 124. In some embodiments, the fingerprint generation engine 120 can include functionality to generate fingerprints for existing software programs. In some embodiments, the fingerprint generation engine 120 can include functionality to generate fingerprints for query code snippets. In some embodiments, the fingerprint generation engine 120 can generate fingerprints as described herein in reference to FIGS. 4, 5, 6A and 6B. in some embodiments, the fingerprint generation engine 120 can generate fingerprints using similar methods to those described herein, or other methods. The code identification manager engine 124 can include functionality related to coalescing, or ranking, results from searching the fingerprint data store 114 for fingerprints matching a query code snippet. In some embodiments, the code identification manager engine 124 may rank the results based on the number of matched results, where the greater the number matched results the higher the ranking. In some embodiments, the code identification manager engine 124 may rank the results based on how contiguous the fingerprint matches are (e.g., the interval between fingerprints that are found). For example, where matched results that have a high level of contiguousness are ranked higher than the same number of matched results that have a lower level of contiguousness. Various examples of such code identification systems can have additional components that are not shown in FIG. 1.

Although the above discussion assumes that one user requests access to one or more data sets or requests execution of one or more functions via client computing device 106, other examples may utilize different implementations. For example, an example function access system may receive execution requests from multiple client computing devices 106 or receive changes to a user-defined ontology from multiple client computing devices 102.

Figure 2:
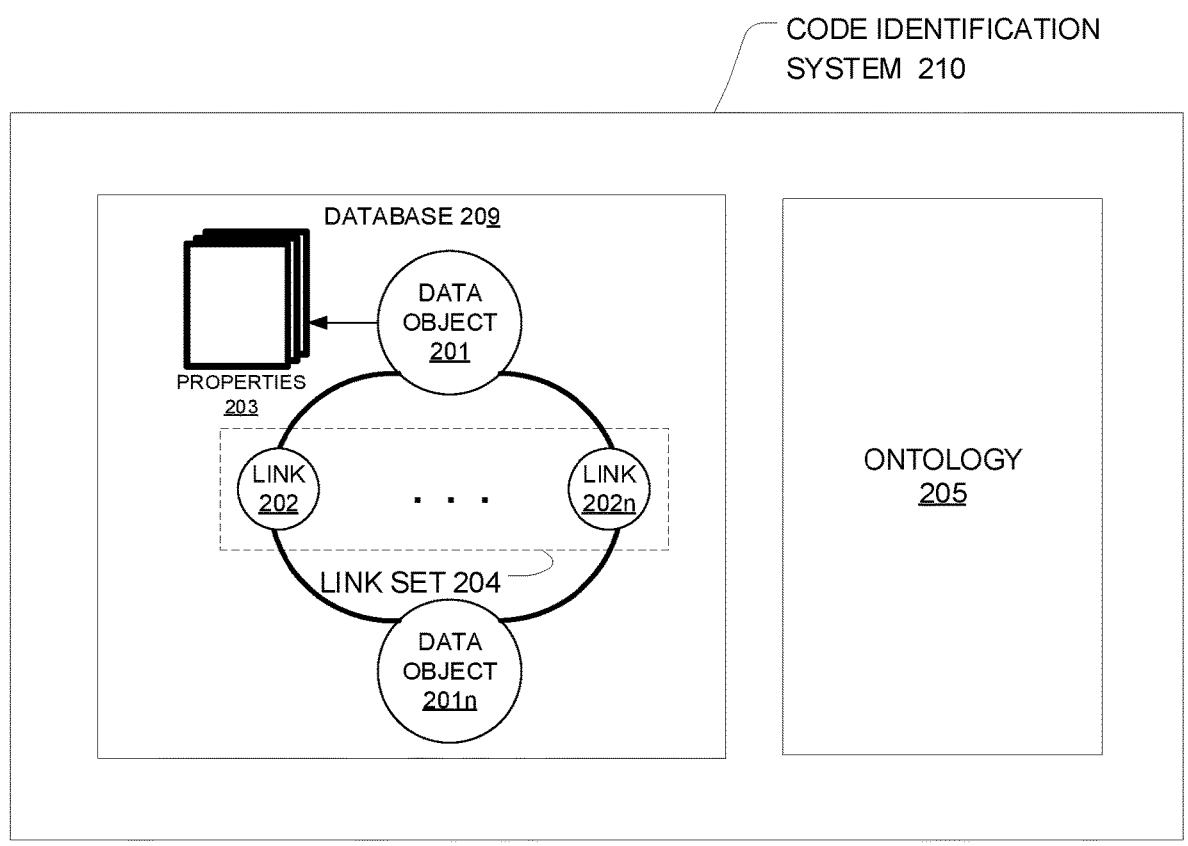
FIG. 2 illustrates one embodiment of a database system using an ontology including object definitions for a type of data objects.

FIG. 2 illustrates an object-centric conceptual data model according to an embodiment. As noted above, an ontology may include object definitions providing a data model for storage of data and data objects. The example of FIG. 2 shows an example ontology 205, which e.g. may be stored in ontology data store 114. The example of FIG. 2 further shows example data stored in a database 209, which, in an implementation, corresponds to, or is the same as, data object data store 130. The ontology 205 may be defined by one or more object types, which may each be associated with one or more property types. At the highest level of abstraction, data object 201 is a container for information representing things in the world. For example, data objects 201-201*n* can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the code identification system 210 may have a property type defined by the ontology 205 used by the database 209.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on 3/27/2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202-202*n* represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
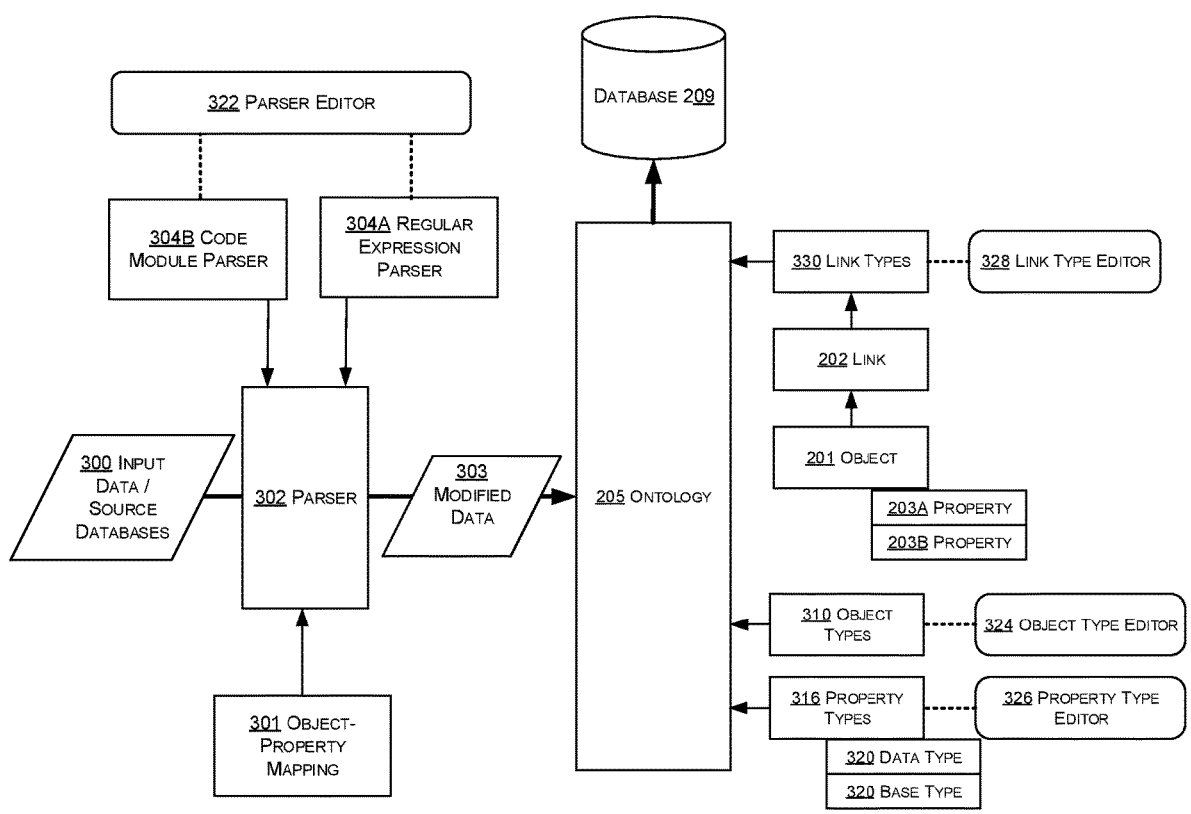
FIG. 3 illustrates one embodiment of a system for creating data in a data store using a dynamic ontology including object definitions for a type of data objects.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to the object definitions in ontology 205 by storing values of the new or modified data in a property of the specified property type. As a result, input data 300 having varying format or syntax according to the object definition can be created in database 209. The object definitions of ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

Figure 4:
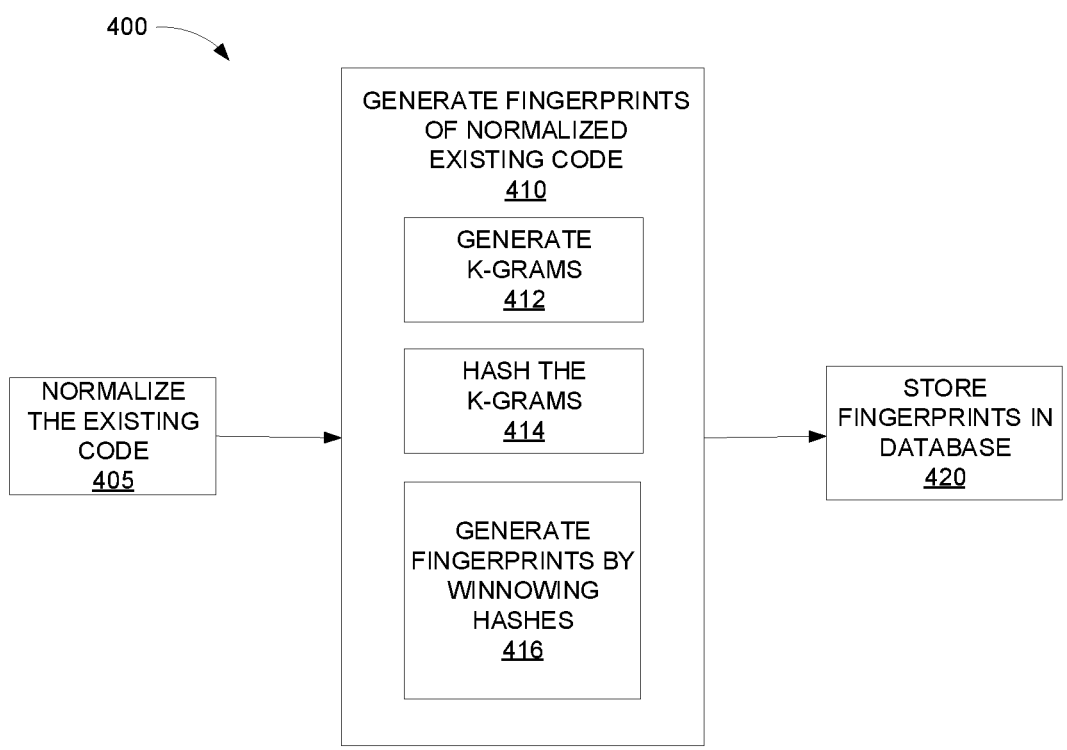
FIG. 4 is a schematic illustrating an example for determining a fingerprint for searching for code similar to a certain code snippet, according to an embodiment.
Figure 5:
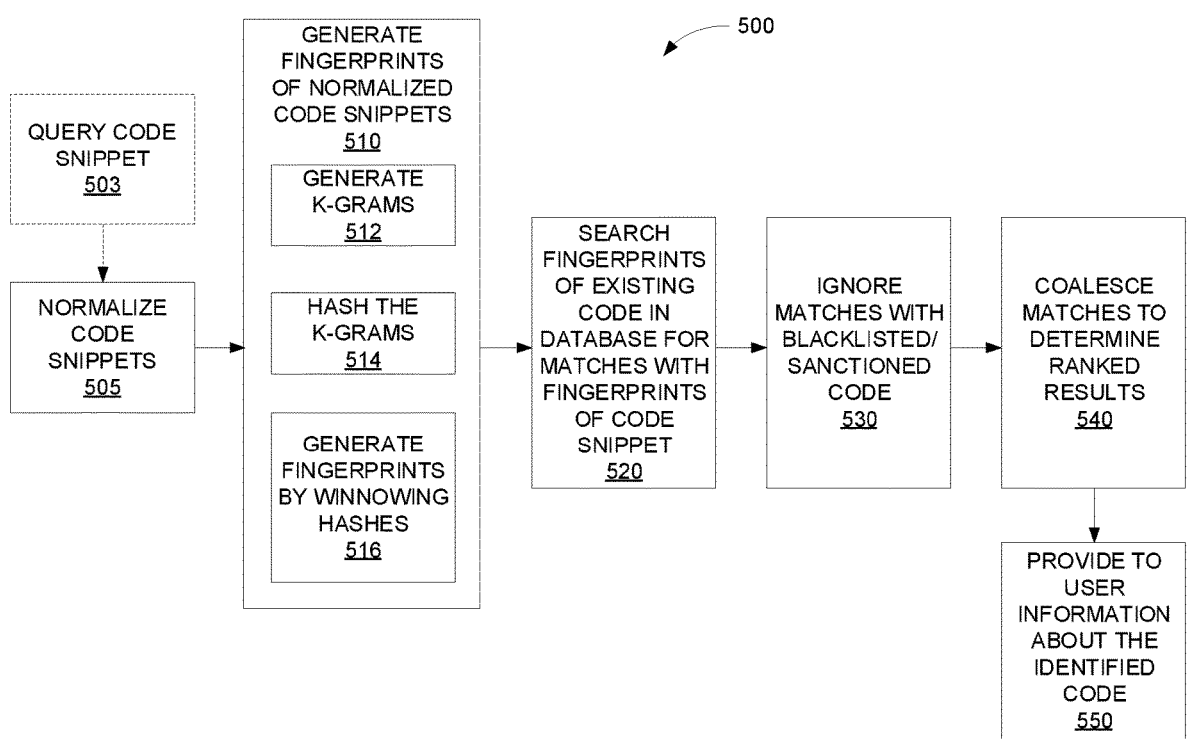
FIG. 5 is an example user interface implementing the function access methods described herein, according to some embodiments.

FIGS. 4 and 5 are block diagrams illustrate an example of processes for using fingerprints of code snippets (sometimes referred to herein as "query code snippets") to find certain code in previously stored code, such that it may be partially or wholly reused. Specifically, FIG. 4 is a diagram that illustrates an example of a process 400 for determining fingerprints for existing code which is stored on a computer storage component, and then storing the fingerprints in a database. FIG. 5 is a diagram that illustrates an example of a process 500 for determining fingerprints for query code snippets, and then searching the database of fingerprints, representing existing code, to identify existing code that is similar to the query code snippets that a user may want to use in a new application, according to some embodiments. Such processes allow a user to quickly determine if there is pre-existing code that is similar, or identical, to code needed (e.g., for a new project), and allows existing code to be re-used (e.g. for the new project), increasing the efficiency of the code generation process as resources can be used to generate new code rather than re-generate code that has been written previously. In FIG. 4 and FIG. 5, corresponding blocks 405 and 505, and corresponding blocks 410 and 510, relate to certain functionality for normalizing existing code/query code snippets, and generating fingerprints of code/query code snippets including generating k-grams, hashing the k-grams, and generating fingerprints by winnowing the hashes. This functionality may be similar for both processing existing code and for processing query code snippets, and in some embodiments it may be advantageous for this functionality to be that it is similar, or identical. To avoid redundancy of the description of this functionality, such similar functionality is described with respect to blocks 405 and 410 of FIG. 4, and then referenced when describing block 505 and 510 in FIG. 5.

Figure 7:
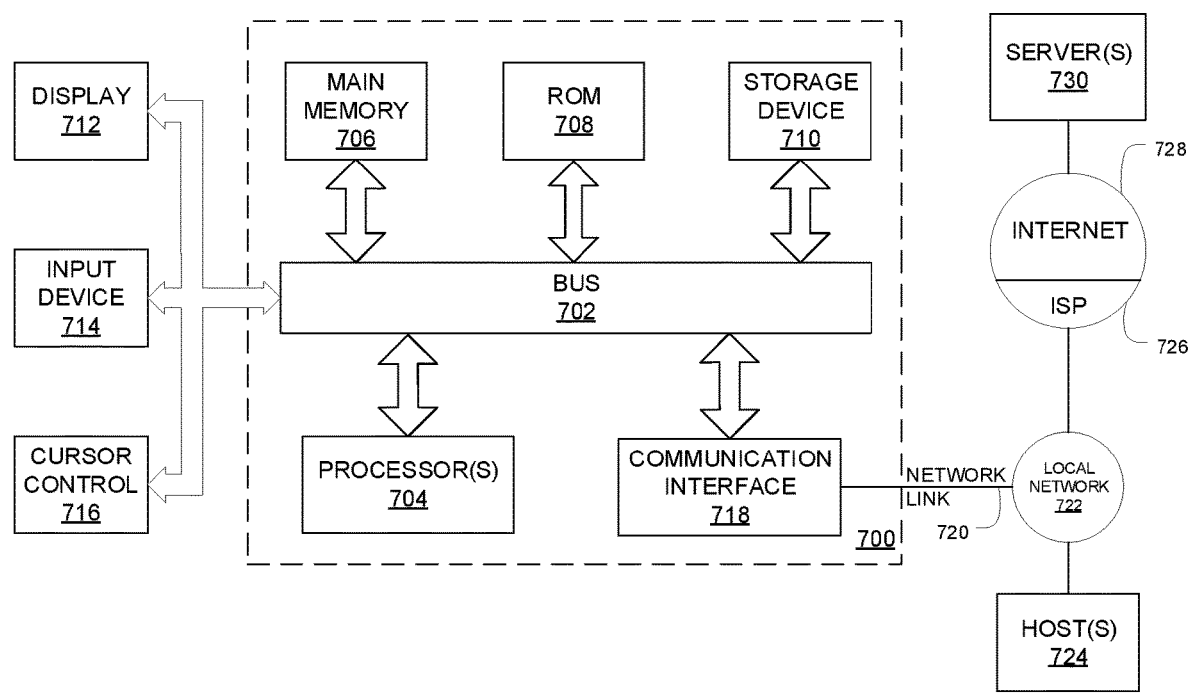
FIG. 7 is a block diagram of an example computing system configured to perform data propagation and mapping.

The blocks illustrated in FIG. 4 and FIG. 5 represent examples of certain functionality that can be employed to generate and store fingerprints of code, and generate fingerprints of query code snippets that can be used to search the stored fingerprints of exiting code for similarities to identify portions of the stored code that may be used, e.g., for another purpose. The functionality can be incorporated in software and/or hardware. The fingerprints can be stored in a database, for example, an ontological database. FIG. 7 illustrates an example of hardware of a system that can be perform the functionality described herein, in accordance with various embodiments.

Referring to FIG. 4, before fingerprints of existing code are generated, at block 405 the process 400 can normalize the code. As described later, when a fingerprint is generated for a query code snippet, the query code snippet may also first be normalized. Normalizing the code will allow searches to be conducted across different languages and formats of the code, thus a search is not limited to finding similar code only in the searched for code language or format. A normalizing process can be different for different query types. For example, normalizing a java code snippet can look different from normalizing a typescript code snippet. In some embodiments, the search engine can support this by way of "normalizing plugins." Any of the normalizing functionality described for a plugin can also be implemented by code other than a plugin. In an example, these normalizing plugins would include functionality for replacing all variable names to deterministic variable names, removing whitespaces, and/or removing indents as appropriate. In another example, the plugins, may remove comments or other designated portions of the code that may obfuscate the functions and routines that are desired to identify. In another example, the normalizing plugins can expand eligible lambdas to deterministic for-loops. In various embodiments, different levels or types of normalizing may be employed. In some embodiments, normalizations and searches of the code at certain normalization levels can be tracked over time to determine a relationship between an amount of normalization and a corresponding metric indicative of its ability to yield accurate results when searched, and this relationship can subsequently be used to determine an amount of normalization to apply to code.

After the code is normalized, at block 410 the process generates fingerprints of the normalized code. The fingerprints can be generated in a number of ways. In this illustrative example, at block 412 the process 400 generates k-grams of the code. At block 414 the k-grams are hashed. At block 416 the fingerprints are selected by winnowing the hashes, reducing the hashes to a subset that form that fingerprints of the code. In an example, determining the fingerprint can include determining windows of hashes of a certain length, and then winnowing the windows of hashes to determine fingerprints representative of the code. After the fingerprints are determined, at block 420 the process 400 stores the fingerprints in a format for quick and efficient searching of the fingerprints. In an example, the fingerprints can be stored in a database based on an ontology to allow fast searches of the database to identify similar code based on the fingerprints. For example, fingerprints may be associated with an object type, e.g., a fingerprint object type, and stored in a database along with relationships to other objects, such as one or more person objects, document objects, and the like. The relationships between various object types may be determined based on an ontology, such as is discussed with reference to FIG. 2 and FIG. 3. An illustrative example of determining fingerprints is described below, however, various embodiments can determine fingerprints of the code in other ways. Although the processes described herein provide an illustrative example of a process for generating fingerprints, or portions of a process, these examples are not meant to be limiting.

The following description relates to a specific example of determining fingerprints of code, or fingerprints of query code snippets. In some examples, the pre-existing code applications are each processed in their entirety. In other examples, the pre-existing code can be divided-up into smaller portions, and fingerprints for such portions can be determined. As mentioned above, the fingerprint generation process is described here in reference to block 410 of FIG. 4, for existing code, but it also directly relates to a fingerprint process for generating fingerprints of query code snippets in reference to block 510.

Referring to FIG. 4 block 412, once the code is normalized, k-grams of the code can be generated. The k-gram includes a contiguous substring of data of length k. A document or code can be divided into k-grams, where k is a parameter that may selected by a user. In other examples, k may be predetermined, or may be automatically determined. For example, based on a user input of a confidence value, of a system may dynamically determine parameter k based on the results of multiple runs and tracking the results of searching using various k values. In various embodiments, value of k can be, for example, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or more than 100. Smaller k values can result in a greater number of matched data hits, and larger k values can result in a lower number of matched data hits, but ultimately identify code more closely matched to the query code snippet. Accordingly, in some embodiments, smaller values of k (e.g., less than 10 or less than 20) are typically not used, unless the query code snippet is also relatively short in length.

In this example, given certain preexisting code, the process ultimately wants to identify substring matches between a query code snippet and preexisting code that satisfy two properties which are based on a "guarantee threshold" t and a "noise threshold" k. The first property is that if there is a substring match, between the code snippet and existing code, that is at least as long as the guarantee threshold, t, then this match should be detected. The second property is that substring matches between the code snippet and existing code shorter that are shorter than a noise threshold, k, should not be detected. A fingerprint search process can avoid matching strings below the below the noise threshold by considering only hashes of k-grams (that is, k-grams of a certain size k). The larger k is, the higher the confidence that matches between code are not coincidental. In some embodiments, the constants t and k can be selected by the user. In some embodiments, k can be predetermined. In other embodiments, the k can be dynamically determined by the system. In an example, k may be increased when fingerprint matches are not relevant because the "noise level" of the matches is too low (e.g., indicating the fingerprints are not distinct enough). In an example, k can be lowered when not enough results are obtained. On the other hand, larger values of k also limit the sensitivity to reordering of code contents, as the relocation of any substring of length less than k cannot be detected. Thus, it is important to choose a value for k to be a minimum value that eliminates coincidental matches. In some embodiments, the value of k can be determined from a lookup table that stores various k values based on a criteria. For example, for generating a fingerprint of existing code, the criteria for k can be related to the language the code was written in. For example, for generating a fingerprint of a query code snippet, the criteria can be related to the size of the query code snippet, a perceived uniqueness of the query code snippet, or a relative number of search results desired.

For this illustrative example, let k=5. In this example, the code of interest to generate a fingerprint of (e.g., existing code or a query code snippet) is "See Dixon run, run Dixon run." With the irrelevant text removed (e.g., spaces, punctuation, and the like), this text string is now "seedixonrunrundixonrun." The sequence of 5-grams (e.g., k-grams where k=5) derived from this text string is shown in the 18 5-grams below:

seedi eedix edixo dixon ixonr xonru onrun nrunr runru
    unrun nrund rundi undix ndixo dixon ixonr xonru onrun In reference to block 414, the k-grams can be hashed. In various embodiments, a "hash" can be generated for each k-gram. A "hash" or "hashing data" as used herein are broad terms that relate to a function that converts one value to another, the resulting value being referred to as a "hash." Hashing data is commonly computer science technologies for different purposes, for example, checksum generation and indexing. In various embodiments, hashes can be used to index data. In an example, hashing values can be used to map data to individual "buckets" within a hash table. Each bucket has a unique ID that serves as a pointer to the original data. This creates an index that is significantly smaller than the original data, allowing the values to be searched and accessed more efficiently. In this example, hashes are used to generate a "fingerprint" set of data that represents a portion of the existing code, or a query code snippet.

In reference to block 416, fingerprints can be generated by winnowing the hashes. A hypothetical sequence of hashes of the 18 5-grams, that are listed above, is:

77 74 42 17 97 58 71 30 47 13 19 28 98 11 32 97 58 71

Given a sequence of hashes $h_1 \ldots h_n$, if n>t−k, then at least one of the $h_i$ must be chosen to guarantee detection of all matches of length at least t. Accordingly, in one example, let the window size be w=t−k+1. Consider the sequence of hashes $h_1 h_2 \ldots h_n$ that represents a document. Each position 1≤i≤n−w+1 in this sequence defines a window of hashes $h_i \ldots h_{i+w-1}$. To maintain the guarantee, it is necessary to select one hash value from every window of hashes to be a fingerprint of the document. To do so, a winnowing strategy may be employed. In an example, the following "winnowing" strategy can be used: (i) in each window of hashes, select the minimum hash value; (ii) if there is more than one hash with the minimum value, select the rightmost occurrence; (iii) now save all selected hashes as the fingerprints of the document.

In an example of winnowing, windows w of hashes of length=4 are determined for the hypothetical sequence of hashes (examples of the location of the first three windows as shown explicitly):

sequence of hashes: 77 74 42 17 97 58 71 30 47 13 19 28 98 11 32 97 58 71

[window #1]=77 74 42 17
  [window #2]=74 42 17 97
    [window #3]=42 17 97 58
      Etc.

Accordingly, the windows of hashes of length 4 are:

(77 74 42 17) (74 42 17 97) (42 17 97 58) (17 97 58 30) (97 58 71 30) (58 71 30 47)

(7130 47 13) (30 47 13 19) (47 13 19 28) (13 19 28 98) (19 28 98 11) (28 98 11 32)

(98 11 32 97) (1132 97 58) (32 97 58 71)

The 15 windows of hashes of length=4 for the hypothetical sequence of hashes are shown above. A particular hash is "selected" (e.g., shown in bold in the windows above) only once, in the window that first selects that hash. In other words, a particular hash is selected the first time it appears in a window and it is the minimum hash, but only the first time. For example, in the first window (77 74 42 17), the hash "17" is selected. The same hash "17" also appears in the second window (4 42 17 97), the third window (42 17 97 58), and the fourth window (17 97 58 30), and hash "17" is the minimum value in each of these windows. However, hash "17" only selected (indicated in bold) in the first window (77 74 42 17) because that is the first time that particular hash appears in any window. Each hash selected is shown in boldface in the windows of sequence of hashes shown above.

In another example, hash "30" is selected in the fifth window because it is the minimum hash in the window, and it is the first time it appears in the window. Hash "30" also appears in the sixth window, but it is not selected (indicated in bold) because it has already appeared, and been selected, in the fifth window. The seventh window also includes hash "30" but it also includes hash "13" which is selected as it is the minimum hash and the seventh window is the first time hash "13" appears in a window. Hash "13" appears in the eighth window but it is not selected because it has already been selected in the seventh window. In window 15 hash "32" is selected because it is the minimum hash in the window. Hash "32" also appeared in window 14, but in window hash "32" was not selected because hash "11" is the minimum value. Hash "11" is not selected in window 14, window 13, or window 12 because hash "11" was previously selected in window 11.

The reasoning behind choosing the minimum hash is that the minimum hash in one window is very likely to remain the minimum hash in adjacent windows (as seen in the example above) since the odds are that the minimum of w random numbers is smaller than one additional random number. Thus, many overlapping windows select the same hash, and the number of fingerprints selected is far smaller than the number of windows while still maintaining the guarantee. Other embodiments of winnowing can use a different window w size. For example, a window w size of 3, 5, 6, 7, 8, 9, or 10. In some embodiments, a window size larger than 10 can be used, for example, a window w of size 11, 12, 13, 14, 15 or larger.

In some examples, all of the selected hashes can then be saved as the fingerprints of the code or the code snippet. For the example above, the set of fingerprints selected by winnowing the hashes for the string "See Dixon run, run Dixon run" are: {17 30 13 11 32}.

In some embodiments it is useful to record not only the fingerprints of the code, but also the position of the fingerprints in the code. Some embodiments of winnowing can retain the position of the most recently selected fingerprint. Accordingly, the set of fingerprints selected by winnowing can include positional information of the hash in the sequence of hashes. That is, for each hash determined as a result of the winnowing process, the position of that hash, in the original sequence of hashes, can also be included in the fingerprint. In this example, the fingerprint is paired with 0-base positional information of the location of the hash in the sequence of hashes sequence of hashes "77 74 42 17 97 58 71 30 47 13 19 28 98 11 32 97 58 71." Using 0-base positional information results in the hashes (in the sequence of hashes shown below (to have the following positional information, where the positional information is shown in parenthesis (for example, hash(positional_information):

77(0) 74(1) 42(2) 17(3) 97(4) 58(5) 71(6) 30(7) 47(8) 13(9)

19(10) 28(11) 98(12) 11(13) 32(14) 97(15) 58(16) 71(17)

Accordingly, in this example, the set of fingerprints that include the and can be represented by a fingerprint including the hash and the 0-base position information [hash, position] pairs for this example (note: selected hashes underlined in sequence of hashes shown above):

[17, 3] [30, 7] [13, 9] [11, 13] [32,14]

The positional information can be used during the coalescing process to determine how close together, or far apart, any matched hashes are in identified software programs.

In reference to block 420, fingerprints for the existing code can be stored in a database, for example, an ontological database. As described in reference to FIG. 5, fingerprints of a query code snippet can be used to search fingerprints of pre-existing code for similarities (matches of the fingerprints). In some embodiments, a fingerprint can be associated with an object, or represented by an object, and stored in a database, for example, an ontological-structured database. Such objects can be used to identify similar code, for example, by identifying code with similar functions or routines. In some embodiments, fingerprints can generated for the pre-existing code and other information relating to the fingerprints are stored in an ontology-based database. Then, fingerprints generated for query code snippets can be used to search the fingerprints stored in the ontology-based structure to determine similar code for re-use.

FIG. 5 illustrates a process 500 for determining fingerprints for query code snippets, and searching the stored existing code for similar fingerprints associated with stored existing code using the fingerprints of the query code snippets, according to some embodiments. The process 500 can start at block 503 by a user writing, or identifying, a query code snippet for which they want to find similar code. At block 505 the process 500 can normalize the code. Normalizing the query code snippet allows searches to be conducted across different languages and formats of the code, thus a search is not limited to finding similar code only in the searched for code language or format. Normalizing the query code snippet in block 505 can be done using the same, or a similar, normalization process as used for the existing code, as described in reference to block 405, The normalizing process for the query can be different for different query types. For example, normalizing a java code snippet can look different from normalizing a typescript code snippet. In some embodiments, a normalization plugin can be used, the normalizing plugin having functionality for replacing all variable names to deterministic variable names, removing whitespaces or indents as appropriate, expanding eligible lambdas to deterministic for-loops, and the like. In various embodiments, different levels or types of normalizing may be employed.

After the query code snippet is normalized, at block 510 the process generates fingerprints of the normalized code. The fingerprints of the query code snippets can be generated in the same way as the fingerprints of the existing code, described above in reference to block 410. For example, at block 512 the process 500 can generate k-grams of the query code snippet similar to generating k-grams for the existing code described in reference to block 412. At block 514 the k-grams query code snippet can be hashed similar to generating k-grams for the existing code, as described in reference to block 412. At block 516 the fingerprints of the query code snippets can be determined by winnowing the hashes, reducing the hashes to a subset that form that fingerprints of the query code snippet, similar to the winnowing processes used for winnowing the hashes of the existing code, described in reference to block 416. In some examples, winnowing can be used to treat the fingerprinting processes done at different times, differently. That is, to treat a first fingerprint process performed at a database-build time and a second print process performed at a (different) query time, differently. In some embodiments, for a database of fingerprints (obtained from k-grams) generated by winnowing documents with window size $w_1$, query code snippets can be fingerprinted using a different window size $w_2$. As an example, let Fw be the set of fingerprints chosen for existing code (the code searched) by winnowing with window size $w_1$. The advantage of winnowing query code snippets with a window size $w_2 \geq w_1$ is that $Fw_2 \subseteq Fw_1$, which means fewer memory or disk accesses to look up fingerprints. This may be useful if, for example, the system is heavily loaded and it is desired to reduce the work per query, or if desired in obtaining a faster but coarser estimate of the matching in a document. In some examples, this can be extended further, where a query document is fingerprinted with the same window w used to generate the database, and then all of the selected fingerprints are sorted in ascending order. Next, some number of the fingerprints can be looked up in the database, starting with the smallest fingerprint. Then at one extreme, the search of fingerprints can be stopped after a few, fixed number of hashes. At the other extreme, all of the hashes are used as fingerprints. This defines a spectrum where the number of hashes can be used between these two extremes. Although the processes described herein provide an illustrative example of a process for generating fingerprints, or portions of a process, these examples are not meant to be limiting.

As indicated herein, normalizing the query code snippets (block 505) may be done using a similar process as normalizing the existing code (block 405). Also, generating fingerprints for the query code snippets (block 510) may be done using a similar process as generating fingerprints for the existing code (block 410). Accordingly, the functionality for these processes is not repeated, instead the above description for blocks 405 and 410 is referenced for the functionality of normalizing a query code snippet (block 505) and generating a fingerprint of a query code snippet (block 510) including generating k-grams of the query code snippet, hashing the k-grams, and winnowing the hashes to determine fingerprints of the query code snippets.

Referring to FIG. 5, at block 520 process 500 searches the fingerprints of existing code in a database using a fingerprints of a query code snippet to determine matches for the fingerprints of the query code snippet, using any suitable database query process. In some embodiments, there may be some pre-existing code that the user does not want to copy/use, even if there is a fingerprint match. Pre-existing code that the user does not want to use even if a match occurs can be listed in an index (e.g., a "blacklist" index). In an example, sanctioned copies of code (e.g., boilerplate) may be included in the blacklist index. In another example, code that is licensed and according to the license cannot be copied, may also be included in the blacklist index. In another example, code may be specially designated for certain projects and it is desired not to have this code copied—such code can also appear in the blacklist index. In another example, code that is written for certain customer under an agreement not to use the code for other purposes, can also appear in the blacklist index. After a list of fingerprint matches are determined, at block 530 any of the matches that relate to code that is on the blacklist index are removed from the list of matches.

At block 540, the individual fingerprints can be coalesced to identify larger blocks of matches within a single document, and the larger blocks of fingerprint matches may be given a priority ranking to be reviewed first is the most likely matches of the query code snippet. In some embodiments, a coalescing index can be used to determine a ranking value for the fingerprint matches found in a portion of code. In some embodiments, positional information that is determined during winnowing can be used to help determine a coalescing index. For example, as discussed in reference to FIG. 9. In an example, a coalescing index can provide a higher rank based on a greater number of fingerprint matches being determined within a portion of code. In another example, provide a higher rank based on proximity of the fingerprint matches within a portion of code. At block 550 the process 500 can provide to the user information about the code identified as being the closest match to the query code snippet. In an example, a link to the matched code may be provided to the user. In another example, a file that includes portions of the matched code, and information to access the code, may be provided to the user for review. In some embodiments, a user interface is generated and displayed that includes information relating to the results of the search.

Figure 6A:
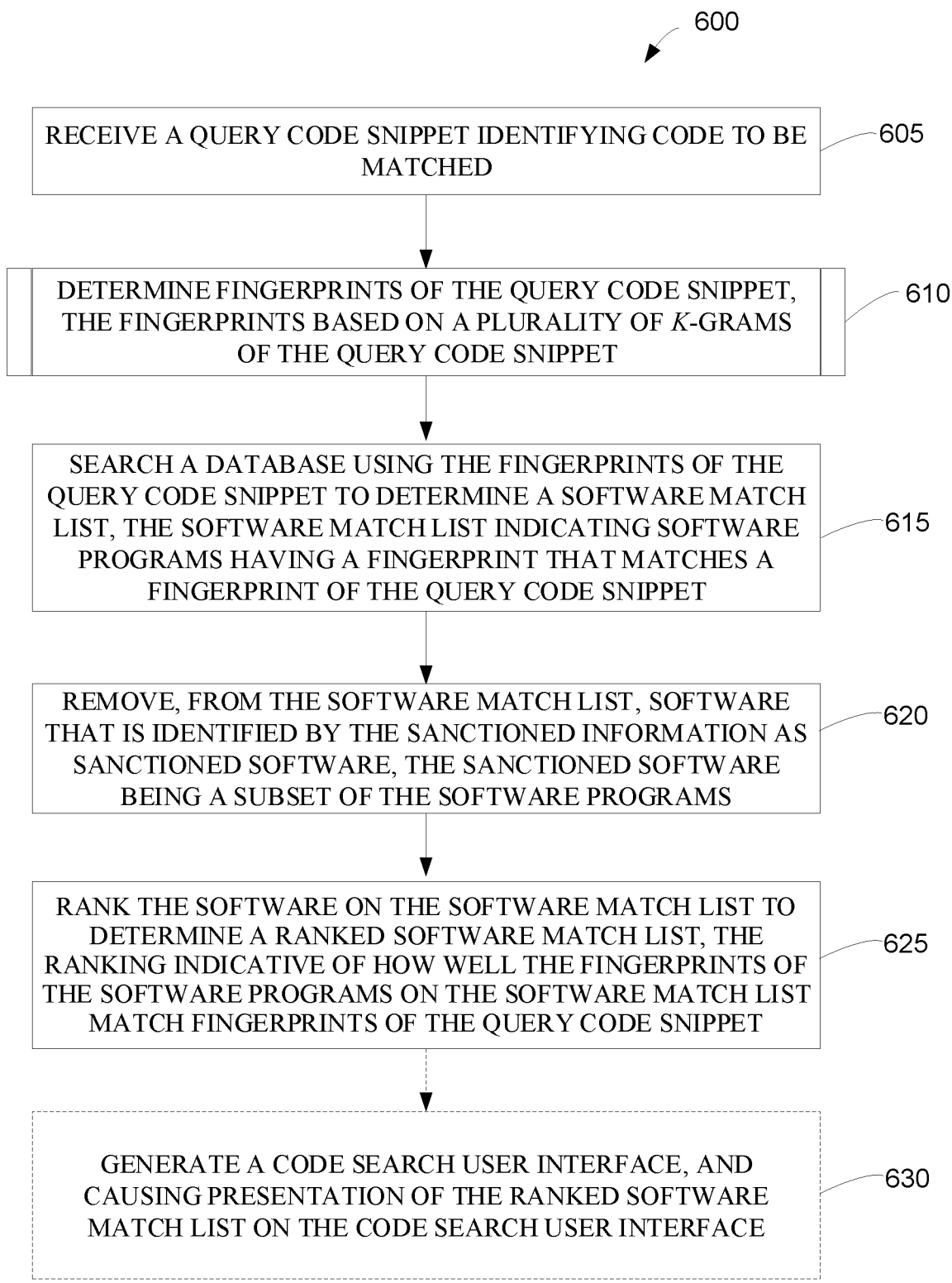
FIG. 6A is a flow diagram depicting an example of a computer-implemented search process for identifying software programs (i.e., code) that were previously written and that have at least a portion of the code being similar to a query code snippet, according to some embodiments.

FIG. 6A is a flow diagram depicting an example of a computer-implemented search process 600 for identifying software programs (i.e., code) that were previously written and that have at least a portion of the code being similar to a query code snippet, according to some embodiments. At block 605 the process 600 receives a query code snippet identifying code to be matched. An example, the query code snippet is received by the process 600 from a user input using a user interface device (e.g., a keyboard), for example, input device 714 (FIG. 7). An example, the query code snippet is received by the process 600 from the file, that a user previously input or that a user selected.

At block 610, the process 600 determines fingerprints of the query code snippet. The fingerprints that are generated are based on a plurality of k-grams of the query code snippet. Illustrative examples of generating fingerprints are disclosed herein, and also illustrated in a flow diagram FIG. 6B.

At block 615, the process 600 searches a database using the fingerprints of the query code snippet to determine a software match list, the software match list indicating software programs having a fingerprint that matches a fingerprint of the query code snippet. The database is configured to store fingerprints of each of the software programs in a searchable format, and to store information associating each fingerprint stored in the database with its respective software program.

At block 620, the process 600 removes, from the software match list, software that is identified by the sanctioned information as sanctioned software, the sanctioned software being a subset of the software programs. In some embodiments, the sanctioned code includes library code. In some embodiments, the sanctioned code includes boilerplate code. In some embodiments, the sanctioned code includes code that has been designated to not be included in the software match list. For example, code that was written for specific purpose, or customer, and that has been designated not to be used on other projects, or for other customers.

At block 625, the process 600 ranks the software on the software match list to determine a ranked software match list, the ranking indicative of how well the fingerprints of the software programs on the software match list match fingerprints of the query code snippet. In some embodiments, the ranking can be based on the number of matched k-gram results between fingerprints of the code and fingerprints of the query code snippet. For example, where the higher the number of matched k-grams the higher the ranking. In some embodiments, the ranking can be based on how contiguous matched k-gram results are between fingerprints of the code and fingerprints of the query code snippet, where the more contiguous the matched k-grams are, the higher the ranking. In some embodiments, the ranking can be based on two or more factors. For example, the contiguousness of the k-gram matched results in the number of matched k-grams. In some embodiments, the ranking can be based on other factors. The ranking of the matches may be referred to as coalescing the matches, referring to a process for organizing and/or ranking the matched results.

At block 630, in some embodiments, the process 600 also generates a code search user interface and causes presentation of the ranked software match list on the code search user interface. In some embodiments, the process 600 generates the file that includes the ranked software match list, in the file may be provided to the user. It will also be appreciated that additional or fewer steps may be included in other embodiments.

Figure 6B:
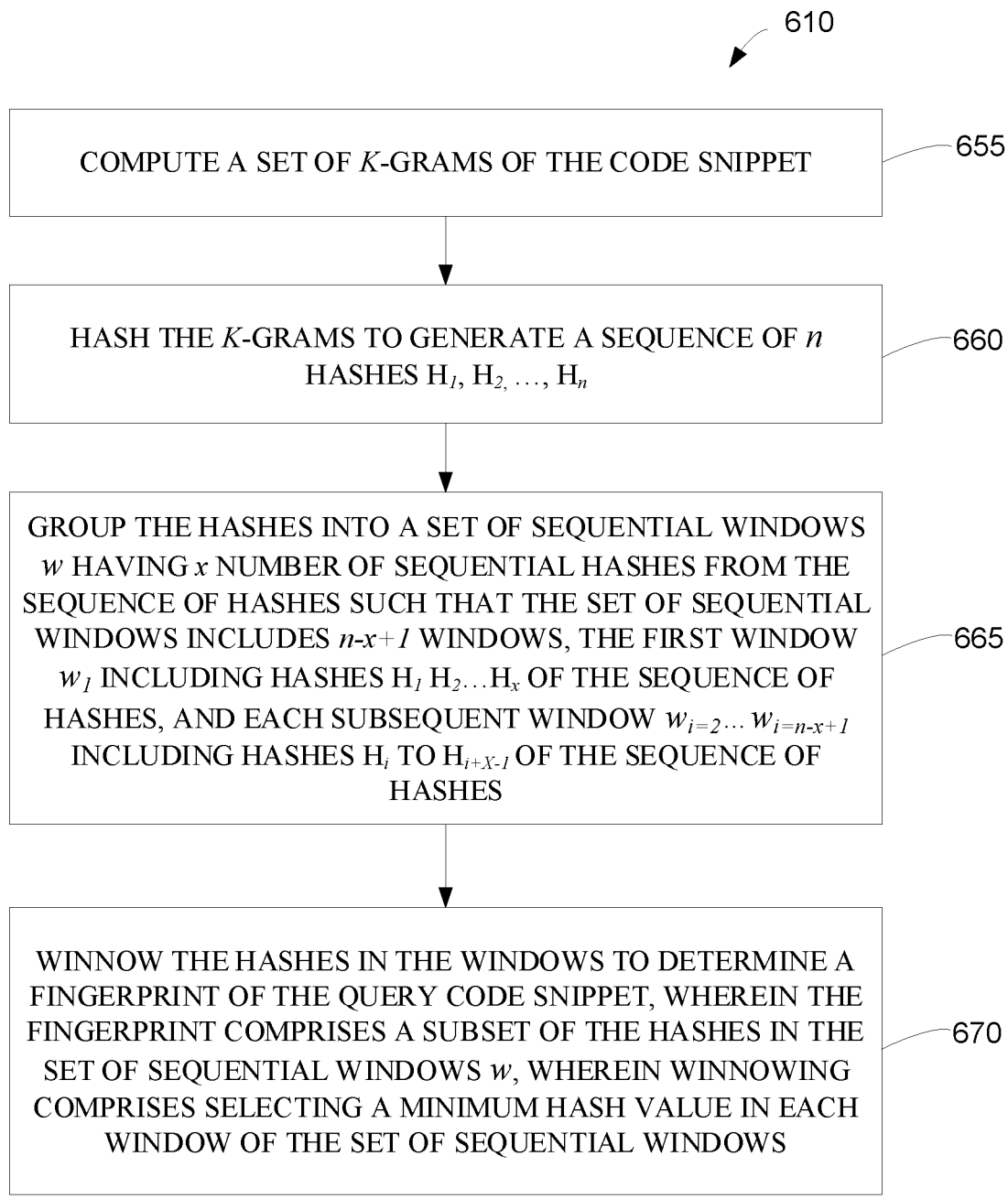
FIG. 6B is another flow diagram depicting an example of a computer-implemented process for generating fingerprints of code, in which can be used to generate fingerprints a previously generated code and/or fingerprints of query code snippets, according to some embodiments.

FIG. 6B is another flow diagram depicting an example of a computer-implemented process 610 for generating fingerprints of code, in which can be used to generate fingerprints a previously generated code and/or fingerprints of query code snippets, according to some embodiments. At block 655 the process 600 computes a set of k-grams of the code snippet. In various embodiments, the k-grams can be of various length, for example, 5, 10, 15, 20, 25, 30, 35, 40, 45, or 50, or greater than 50. At block 660 the process 600 hashing the k-grams to generate a sequence of n hashes $h_1$, $h_2, \ldots, h_n$. Various embodiments of such processes can employ various algorithms of hashing the k-grams.

At block 665, the process 600 groups the hashes into a set of sequential windows w having x number of sequential hashes from the sequence of hashes. In an illustrative embodiment, the set of sequential windows includes n−x+1 windows, the first window $w_1$ including hashes $h_1 \, h_2 \ldots h_x$ of the sequence of hashes, and each subsequent window $w_{i=2} \ldots w_{i=n-x+1}$ including hashes $h_i$ to $h_{i+x-1}$ of the sequence of hashes. As a person of ordinary skill in the art will appreciate, the process in block 665 is an example of how hashes can be organized, in other ways to organize the hashes are possible.

At block 670, the process 700 winnows the hashes in the windows to determine a fingerprint of the query code snippet. In this example, the fingerprint includes a subset of the hashes in the set of sequential windows w, wherein winnowing comprises selecting a minimum hash value in each window of the set of sequential windows. In various embodiments, the process 700 can select a subset of the hashes in various ways to generate the prints of the query code snippet.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, declarative programming languages, such as SQL, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 7 is a block diagram that illustrates a computer system 700 upon which various embodiments may be implemented. Computer system 700 includes a bus 702 or other communication mechanism for communicating information, and a hardware processor, or multiple processors, 704 coupled with bus 702 for processing information such as data entries from one or more data stores. Hardware processor(s) 704 may be, for example, one or more general purpose microprocessors configured to execute data propagation and mapping instructions.

Computer system 700 also includes a main memory 706, such as a random access memory (RAM), cache and/or other dynamic storage devices, coupled to bus 702 for storing data entries and instructions to be executed by processor 704. Main memory 706 also may be used for storing temporary variables or other intermediate information during execution of fingerprint generating and searching instructions to be executed by processor 704. Such instructions, when stored in storage media accessible to processor 704, render computer system 700 into a special-purpose machine that is customized to perform the operations specified in the fingerprint generating and searching instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and data propagation and mapping instructions.

Computer system 700 may be coupled via bus 702 to a display 712, such as a cathode ray tube (CRT) or LCD display (or touch screen), for displaying graphical user interfaces or data entry information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, fingerprint generating, searching, and transmitting process steps herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the fingerprint generating, searching, and transmitting process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicate with a WAN). Wireless links may also be implemented. In any such implementation, communication interface 718 sends and receives electrical, electromagnetic or optical signals that carry digital data streams representing various types of information. In some embodiments, communication interface 718 may allow computing system 700 to receive and transmit data entry information from one or more code queries and/or code data stores.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 830 might transmit a requested code for an application program through Internet 728, ISP 726, local network 722 and communication interface 718. In some embodiments, computing system 700 may receive and transmit data entry or data set information from one or more databases across network link 720.

The received code may be executed by processor 704 as it is received, and/or stored in storage device 710, or other non-volatile storage for later execution. The received data entry or data set information may be stored in storage device 710 and manipulated, analyzed, or processed by processor 704 according to fingerprint generating and searching instructions stored in or received by computing system 700.

Figure 8:
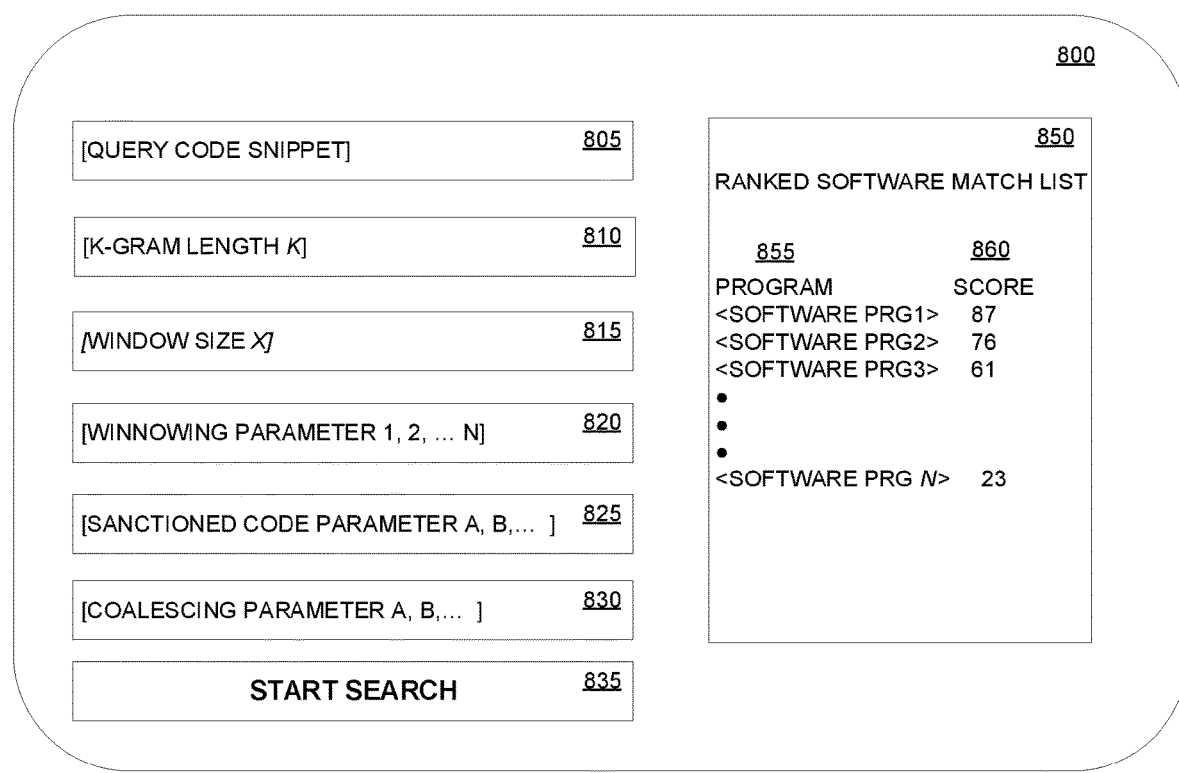
FIG. 8 is an example of a code search graphical user interface (GUI) that can be generated and presented on a display, the code search GUI facilitating a code search causing presentation of a ranked software match list on the code search GUI.

FIG. 8 is an example of a code search graphical user interface ("interface") 800 that illustrates exemplary information that can be generated and presented on a display according to some embodiments, the code search interface facilitating a code search causing presentation of a ranked software match list on the interface 800. In various embodiments, additional information may be displayed on interface 800, less information may be displayed, or different information may be displayed. In various embodiments, user input fields for additional parameters may be generated and displayed, fewer user input fields may be generated and displayed, or different user input fields may be generated displayed. In field 805 of the interface 800 a user can enter a query code snippet to be searched. In an example, a user may enter the query code snippet using the user input device, for example, a keyboard, or the query code snippet may be cut-and-paste from another window or document.

In field 810 of interface 800, a user can optionally enter the length of the k-gram to use to generate fingerprints of the query code snippet. In some embodiments, a default k-gram length parameter is displayed in field 810 and the user can change the default parameter if desired. In some embodiments, field 810 can be configured such that a k-gram length can be selected using a pulldown menu of k-gram lengths.

In field 815 of interface 800, a user can optionally enter the window size to use to generate fingerprints of the query code snippet. In some embodiments, a default window size parameter is displayed in field 815 and the user can change the default parameter if desired. In some embodiments, field 815 can be configured such that a window size can be selected using a pulldown menu of window sizes.

In field 820 of interface 800, the user can optionally enter a winnowing parameter to use to generate fingerprints of the query code snippet. In some embodiments, a default winnowing parameter is displayed in field 820 and the user can change the default parameter if desired. In some embodiments, field 820 can be configured such that a winnowing parameter can be selected using a pulldown menu of winnowing parameters.

In field 825 of interface 800, the user can optionally enter a sanctioned code parameter (e.g., A, B, C, etc.) to use to exclude certain code form the search results. In some embodiments, each parameter is indicative of a set of one or more software programs, or types of software programs, to exclude from the search results. In some embodiments, a default sanctioned code parameter is displayed in field 825 and the user can change the default parameter if desired. In some embodiments, field 825 can be configured such that a sanctioned code parameter can be selected using a pulldown menu of sanctioned code parameters.

In field 830 of interface 800, the user can optionally enter a coalescing parameter to use to generate fingerprints of the query code snippet. In some embodiments, a default coalescing parameter is displayed in field 830 and the user can change the default coalescing parameter if desired. In some embodiments, field 830 can be configured such that a coalescing parameter can be selected using a pulldown menu of coalescing parameters.

The interface 800 can also include a start search button 835. Once the user is satisfied with the parameters for the search, the start search button 835 may be activated in the system generates the fingerprints of the query code snippet and performs a search of pre-existing stored software for fingerprints that match the fingerprints of the query code snippet.

The interface 800 can also include a ranked software matched list 850, which displays results of the search. In this example, the software matched list 850 includes a column 855 indicating the name of the software program that was found in the search. The software matched list 850 also includes a column 860 that indicates a ranking of the identified software programs (e.g., based on the coalescing parameter). In some embodiments, the software programs indicated in column 855 can be selected from the ranks software match list 850, and additional information of the selected program can be displayed. In some embodiments, selection of the software program in column 855 navigates the user to a copy of the software program for further review.

Figure 9:
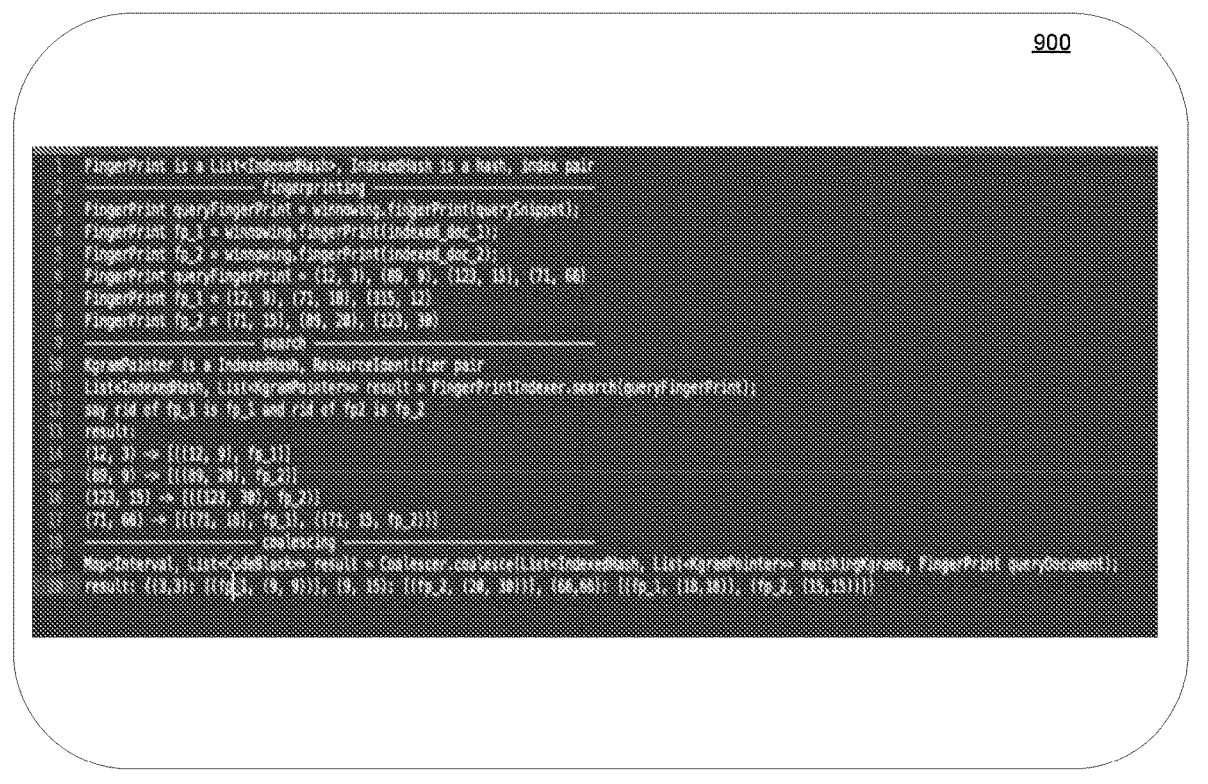

FIG. 9 is an example of a screenshot on a user interface 900 illustrating an example of code that can be used for fingerprinting a query snippet, and then searching for the fingerprinted query snippet, according to some embodiments. The code illustrated in FIG. 9 is an example of one way that functions can be defined for the fingerprinting and searching of the query code snippet, and this example is meant to be merely illustrative, and not limiting in any way. Generally when searching there is one thing that you are searching for (query code snippet) and multiple programs have been previously fingerprinted ("indexed"). As described above, fingerprinting the query code snippet involves using a winnowing process. The fingerprint is a list of indexed hashes. The process begins by generating k-grams of the code snippet, hashing the k-grams, and winnowing the hashes to generate a fingerprint having positional information. In the example shown in FIG. 9, a fingerprint of the query code snippet "queryFingerprint" is generated by the function winnowing.fingerprint(querySnippet). Fingerprints are then generated for two documents, indexed_doc_1 and index_doc_2, such that Fingerprint fp_1=winnowing.fingerPrint(indexed_doc_1), and Fingerprint fp_2=winnowing.fingerPrint(indexed_doc_2).

The screenshot displays the resulting fingerprints of the query code snippet and the two documents as follows:

FingerPrint queryFingerPrint=(12, 3), (89, 9), (123, 15), (71, 66)

FingerPrint fp_1=(12, 9), (71, 18), (325, 12)

FingerPrint fp_2=(71, 15), (89, 20), (123, 30)

where each FingerPrint is a list of pairs, each pair being a hash value and an index value of the hash. The hash value provides information on the content of the k-gram hashed. The index value provides an indication of the position of the hash in the sequence of hashes as a result of winnowing (e.g., generating windows of hashes and selecting a subset of the hashes to be the fingerprint). For example, (12, 3) indicates that "12" is the hash of the k-gram and "3" relates to positional information of the hash in the sequence of hashes, before the winnowing portion of the fingerprint process determines a subset of the all of the hashes in the sequence of hashes to be used as the fingerprint.

After the fingerprints of the query code snippet and the pre-existing documents (e.g., code) are generated, at line 9 the process searches for the fingerprints of the query code snippet in the documents and returns a pointer when a match is found. For example, for the fingerprint of the query code snippet (12, 3), (89, 9), (123, 15), (71, 66)

the first hash "12" is found in document fp_1 as indicated on line 14 by (12, 3)->[((12, 9), fp_1)]

Similarly the process also found matches for the second hash "89" in fp_2, the third hash "123" in fp_2, and the fourth hash "71" in fp_1 and fp_2 (i.e., two matches one in each document) as indicated in lines 15-17:

(89, 9)->[((89, 20), fp_2)]

(123, 15)->[((123, 30), fp_2)]

(71, 66)->[((71, 18), fp_1), ((71, 15, fp_2))]

These results are then coalesced, which can determine the relevancy of the matches which can be used to rank the matches. In this example, the results were coalesced based on an interval indicating how close together the identified individual fingerprints were found in an identified document. The closer together the fingerprints are found in a document the higher the document can be ranked as a "match." The results of the coalescer in this example indicates an interval of the query document matched to an interval of the searched (existing) documents. The coalescer uses the results of the search and looks at the index values of per document and tries to "merge" them into a single code word. In this example, as shown on line 20, the process returns an interval of the query code snippet matches a certain interval of the indicted document. For example, the interval (3, 3) of the query code snippet matches the interval (9, 9) of fp_1. Interval (9, 9) of the query code snippet matches interval (20, 30) of fp_2. Interval (66, 66) of the query code snippet matches interval (18, 18) of fp_1 and interval (15, 15) of fp_2. The coalescer can rank the results based on the interval. For example, which results have smaller intervals that include more of the results. The results can be then provided to a user, for example, as a matched software list on a user interface. In another example, the results can be provided to a user in a file. In some embodiments, the matched software list may contain links, or other directory-type information, to allow a user to quickly access and identified program on the matched software list to further determine its suitability for use.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

What is claimed is:

1. A code identification computer system, comprising: one or more non-transitory computer readable storage devices configured to store:
    a set of software programs;
    a database configured to store fingerprints of each of a plurality of portions of the set of software programs in a searchable format, and to store information associating each fingerprint with the respective software program from which the associated portion is derived;
    sectioned information indicative of sanctioned software, the sanctioned software being a subset of the set of software programs, the sanctioned information comprising a plurality of sanctioned fingerprints;
    a plurality of computer readable instructions; and one or more processors configured to execute the plurality of computer readable instructions to cause the computer system to perform operations comprising:
    receiving a query code snippet identifying code to be matched;
    determining fingerprints of the query code snippet, the fingerprints based on a plurality of k-grams of the query code snippet;
    searching the database using the fingerprints of the query code snippet to determine a set of matching portions of the set of software programs each matching portion of the set of matching portions having a fingerprint that matches a fingerprint of the query code snippet;
    removing, from the set of matching portions and using the sanctioned information, any matching portions that match a sanctioned fingerprint to generate an updated set of matching portions;
    coalescing the updated set of matching portions into a software match list; and
    ranking the software on the software match list to determine a ranked software match list, the ranking indicative of how well the fingerprints of the software on the software match list matches fingerprints of the query code snippet.

2. The code identification computer system of claim 1, wherein the one or more processors are further configured to execute the plurality of computer readable instructions to cause the computer system to perform operations comprising:
    generating a code search user interface; and
    causing presentation of the ranked software match list on the code search user interface.

3. The code identification computer system of claim 1, wherein the sanctioned software comprises library code.

4. The code identification computer system of claim 1, wherein the sanctioned software comprises boilerplate code.

5. The code identification computer system of claim 1, wherein the sanctioned software comprises code that has been designated to not include in the software match list.

6. The code identification computer system of claim 1, wherein determining fingerprints of the query code snippets comprises;
    computing a set of k-grams of the code snippet;
    hashing the k-grams to generate a sequence of n hashes $h_1, h_2, \ldots, h_n$;
    grouping the hashes into a set of sequential windows w having x number of sequential hashes from the sequence of hashes such that the set of sequential windows includes n−x+1 windows, the first window $w_1$ including hashes $h_1 h_2 \ldots h_x$ of the sequence of hashes, and each subsequent window $w_{i=2} \ldots w_{i=n-x+1}$ including hashes $h_i$ to $h_{i+x-1}$ of the sequence of hashes; and
    winnowing the hashes in the windows to determine a fingerprint of the query code snipper, wherein the fingerprint comprises a subset of the hashes in the set of sequential windows w.

7. The code identification computer system of claim 6, wherein said winnowing comprises selecting a minimum hash value in each window of the set of sequential windows.

8. The code identification computer system of claim 7, wherein for any window of hashes having more than one minimum value, the selected minimum hash value in the respective window is the right-most minimum hash value in the window.

9. The code identification computer system of claim 8, wherein normalizing the query code snippet is performed prior to the determining the fingerprint of the code snippet.

10. The code identification computer system of claim 6, wherein k is greater or equal to 5, and k is less than or equal to 20.

11. The code identification computer system of claim 6, wherein k is greater or equal to 20, and k less than or equal to 50.

12. The code identification computer system of claim 6, wherein k is greater or equal to 50.

13. The code identification computer system of claim 1, wherein said ranking the software match list comprises ranking the software programs, on the software match list having a higher number of adjacent k-grams matches, higher than software programs on the software match list that do not have adjacent k-grams matches.

14. The code identification computer system of claim 1, wherein the one or more processors are further configured to execute the plurality of computer readable instructions to cause the computer system to perform operations comprising:
    normalizing the query code snippet.

15. The code identification computer system of claim 1, wherein the one or more processors are further configured to execute the plurality of computer readable instructions to cause the computer system to:
    provide the software match list in a file.

16. The code identification computer system of claim 1, wherein the one or more processors are further configured to execute the plurality of computer readable instructions to cause the computer system to:
    generate and store fingerprints of the plurality of portions of the set of programs; and store the fingerprints of the plurality of portions of the set of programs in the database.

17. A computer-implemented method for identifying code, the method comprising:

receiving a query code snippet identifying code to be matched;

determining fingerprints of the query code snippet, the fingerprints based on a plurality of k-grams of the query code snippet;

searching a database using the fingerprints of the query code snippet to determine a set of matching portions of the set of software programs, each matching portion of the set of matching portions having a fingerprint that matches a fingerprint of the query code snippet, wherein the database is configured to store fingerprints of each of a plurality of portions of the software programs in a searchable format, and to store information associating each fingerprint stored in the database with the respective software program from which the associated portion is derived;

removing, from the set of matching portions and using the sanctioned information, any matching portions that match a sanctioned fingerprint to generate an updated set of matching portions, the sanctioned software being a subset of the software programs, the sanctioned information comprising a plurality of sanctioned fingerprints;

coalescing the updated set of matching portions into a software match list; and ranking the software on the software match list to determine a ranked software match list, the ranking indicative of how well the fingerprints of the software programs on the software match list match fingerprints of the query code snippet.

18. The method of claim 17, further comprising:
generating a code search user interface; and
causing presentation of the ranked software match list on the code search user interface.

19. The method of claim 17, wherein determining fingerprints of the query code snippets comprises computing a set of k-grams of the code snippet;

hashing the k-grams to generate a sequence of n hashes $h_1, h_2, \ldots, h_n$;

grouping the hashes into a set of sequential windows w having x number of sequential hashes from the sequence of hashes such that the set of sequential windows includes n−x+1 windows, the first window $w_1$ including hashes $h_1\ h_2 \ldots h_x$ of the sequence of hashes, and each subsequent window $w_{i=2} \ldots w_{i=n-x+1}$ including hashes $h_i$ to $h_{i+x-1}$ of the sequence of hashes; and winnowing the hashes in the windows to determine a fingerprint of the query code snippet, wherein the fingerprint comprises a subset of the hashes in the set of sequential windows w, wherein winnowing comprises selecting a minimum hash value in each window of the set of sequential windows.

20. The method of claim 17, wherein said ranking the software match list comprises ranking the software programs, on the software match list having a higher number of adjacent k-grams matches, higher than software programs on the software match list that do not have adjacent k-grams matches, and wherein the method further comprises normalizing the query code snippet prior to the determining the fingerprint of the query code snippet.

* * * * *

UNITED STATES PATENT AND TRADEMARK OFFICE
CERTIFICATE OF CORRECTION

| | |
|---|---|
| PATENT NO. | : 11,803,357 B1 |
| APPLICATION NO. | : 17/651220 |
| DATED | : October 31, 2023 |
| INVENTOR(S) | : Gokcan Ozakdag |

It is certified that error appears in the above-identified patent and that said Letters Patent is hereby corrected as shown below:

In the Specification

Column 7, Line 35, delete ""a","" and insert -- "a", "s", --.

Column 15, Line 35 (approx.), delete "(7130" and insert -- (71 30 --.

Column 15, Line 37 (approx.), delete "(1132" and insert -- (11 32 --.

In the Claims

Column 29, Line 31, Claim 1, delete "sectioned" and insert -- sanctioned --.

Column 29, Line 46, Claim 1, delete "programs" and insert -- programs, --.

Column 30, Line 23, Claim 6, delete "snipper" and insert -- snippet --.

Column 30, Line 41, Claim 11, delete "k" and insert -- k is --.

Signed and Sealed this
Ninth Day of January, 2024

*Katherine Kelly Vidal*

Katherine Kelly Vidal
*Director of the United States Patent and Trademark Office*